United States Patent [19]

Ozawa et al.

[11] 3,813,921
[45] June 4, 1974

[54] METHOD OF TESTING THE WELD ZONES OF ROLL CONSTRUCTION USING PRESSURIZED AIR

[75] Inventors: Naosuke Ozawa; Tachio Sudo; Shigeki Watanabe, all of Tsu, Japan

[73] Assignee: Nippon Kokan Kabushiki Kaisha, Tokyo, Japan

[22] Filed: Aug. 11, 1972

[21] Appl. No.: 279,939

[52] U.S. Cl. ................................................. 73/40
[51] Int. Cl. ........................................... G01m 3/08
[58] Field of Search ........................... 73/37, 40, 46

[56] References Cited
UNITED STATES PATENTS

| 2,222,079 | 11/1940 | Larson | 73/37 |
| 3,388,587 | 6/1968 | Hara et al. | 73/40 |
| 3,664,965 | 5/1972 | Hirota et al. | 73/40 |

*Primary Examiner*—Richard C. Queisser
*Assistant Examiner*—Daniel M. Yasich
*Attorney, Agent, or Firm*—Moonray Kojima

[57] ABSTRACT

Compressed air is blown through a hole formed at one end of a transverse bulkhead into the clearance formed between a longitudinal bulkhead and a transverse bulkhead to test the water tightness of the weld zones formed thereat. Every block which is built as the hull construction based on known block system progresses, is tested and its water tightness confirmed thereby.

1 Claim, 2 Drawing Figures

METHOD OF TESTING THE WELD ZONES OF ROLL CONSTRUCTION USING PRESSURIZED AIR

BACKGROUND OF THE INVENTION

This invention relates to a method using compressed air for testing the weld zones of each block of hull constructions. More particularly, every block which is built as the construction based on known block system progresses may be tested for water or other liquid tightness using this method.

In hull construction of tankers and the like, many tanks are formed with longitudinal and transverse bulkheads and these bulkheads are welded (usually using a fillet welding method) to each other. It is customary to test the weld zones for water tightness, since each of the tanks may be used in various ways, e.g. oil tank, ballast tank, etc. No leakage from the weld zone is allowable.

In the prior art, the test is carried out by blowing compressed air into every tank, at the time that the hull construction is nearly completed in dock. When the compressed air leaks, the liquid contained in the tank will also leak out. Usually, for the above leakage test, test equipment is arranged at a height of the dock. Accordingly, it is unavoidable that the test may be troublesome and dangerous.

SUMMARY OF INVENTION

Accordingly, an object of this invention is to improve the foregoing prior art method of testing.

Briefly, this invention encompasses a testing method in which air is blown through a hole formed at one end of a transverse bulkhead into the clearance between a longitudinal bulkhead and a transverse bulkhead, which is formed by fillet welding the bulkheads. Every block may thus be tested as the hull construction based on the known block system, progresses.

Advantageously, the invention method is very light, stable and safe as a test for weld zones of hull construction.

Also, advantageously, the novel method is capable of testing leakage from weld zone of every block built as hull construction based on the known block system progresses.

DETAILED DESCRIPTION OF PREFERRED EMBODIMENTS

Figure 1:
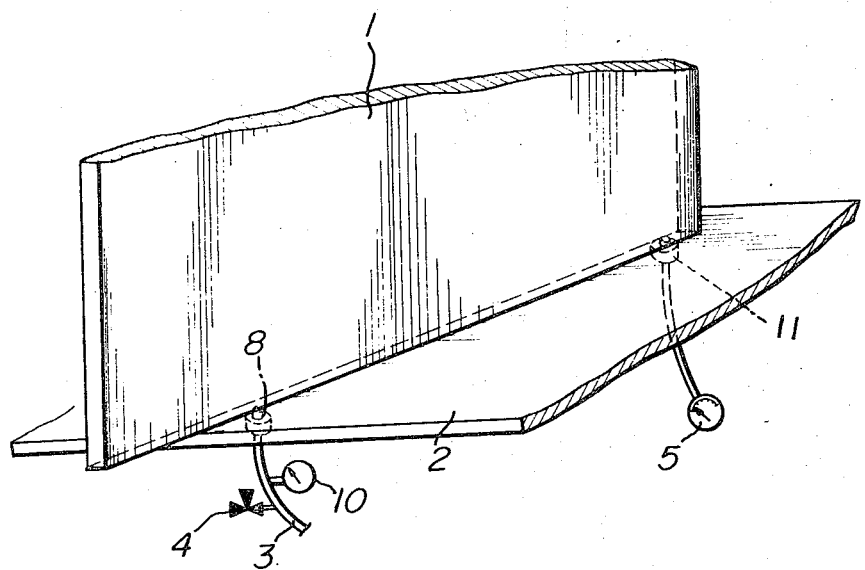
FIG. 1 is a perspective view depicting an illustrative application of this invention.
Figure 2:
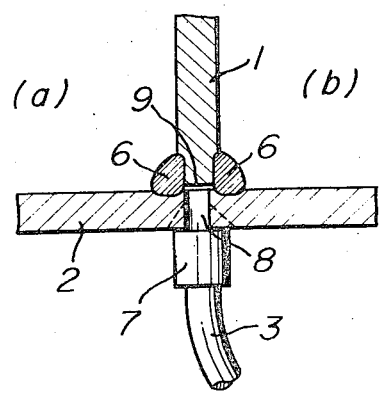
FIG. 2 is a sectional view of a portion showing an air hose.

This invention method may be carried out for every block built as the hull construction, based on a known block system of construction, progresses. An example of a block is shown in FIG. 1 and FIG. 2. The block may comprise a longitudinal bulkhead (1) and a transverse bulkhead (2). Both bulkheads are joined together by a known fillet type of weld. Weld bead lines (6) and some clearance (9) are thus usually formed.

The clearance (9) and holes 8 and 11 connected thereto play an important part in this invention. If a fluid which is filled in a tank formed by the blocks, e.g. air, gas, or liquid, leaks from the weld bead, the leaking fluid will flow an adjacent tank through the clearance (9). When another weld bead line has some defects, the fluid in the clearance may flow into the opposite tank and then both fluids would become mixed thereat. Thus, the mixing of fluids is made through the clearance. Accordingly, it is possible to determine the air or water tightness of the formed tank by determining leakage in the clearance (9).

In this inventive method, small holes (8) and (11), e.g. about 10mm, are made through the transverse bulkhead 2, such as at both ends of the block, and connected to the clearance 9, as depicted (2). Then, an air hose (3) having a safety valve (4) and pressure gauge (10), is connected to hole (8) through a terminal (7). Another air hose having a pressure gauge (5) is connected to another hole (11) in the same manner.

After these preparations, compressed air, e.g. about 0.21 kg/m$^2$ is introduced into the air hose. When the indicating value of gauge (5) is substantially equal to that of guage (10), the weld zone is regarded as being in a sound state and without any leakage. If the indicating value of gauge (5) is lower than that of gauge (10), it shows some leakage of air. In such a case, a suitable amount of surface active agent, e.g. soap water and the like, is spread on the weld bead line 6. The leaking point of weld bead line (6) may be easily found because the surface active agent spread on weld bead line (6) will be bubbling due to the escaping air. The leaking point is repaired and then tested again. When gauge (5) is not changed and the bubbling in not found, it means that the weld zone is blocked up somewhere along the inter-connection.

Thus, compressed air should be continuously fed through a hole formed at one end of a transverse bulkhead into the clearance. When the clearence pressure of fed air is above a predetermined value, safety valve (4) operates and the test is continued with safety. After the test is completed, the holes are repaired and plugged.

The blocks form tanks, such as (a) and (b), in FIG. 2. Advantageously, in contrast to the prior art methods, this invention method may be employed without waiting for the completing of the tank. As mentioned above, this test is carried out for every block built as said hull construction based on the known block system progresses. In such a test, water tight of said weld zone in the hull construction is possible to be confirmed with ease, stability and safety.

The foregoing description is intended to be illustrative of the principles of the invention. Numerous variations and modifications thereof would be apparent to one skilled in the art. All such variations and modifications are to be considered to be within the spirit and scope of the invention.

What is claimed is:

1. A method of testing for leaks in a clearance formed by weld bead lines in a weld zone joining a longitudinal bulkhead to a transverse bulkhead of each block of hull construction, said method comprising the steps of
    A. forming at least two spaced holes through said transverse bulkhead and reaching the clearance formed by said transverse bulkhead and said longitudinal bulkhead;
    B. providing a pressure measuring device connected by a fluid line to each of said holes;
    C. selectively supplying compressed air to one of said holes, said air thereupon filling said clearance to a predetermiend pressure and being applied to both said pressure measuring devices;

D. comparing the pressure at both of said measuring devices, substantially equal pressure at both said measuring devices indicating no leakage in said weld zone and different pressure at said measuring devices indicating leakage in said weld zone;

E. spreading surface active fluid agent on said weld zone bead lines when said pressures are different at said measuring devices; and F. determining accurately the location of leakage in said weld zone by the presence of bubbling of said surface active agent at the point of leakage.

* * * * *